United States Patent
McGehee et al.

(10) Patent No.: US 10,300,407 B2
(45) Date of Patent: May 28, 2019

(54) CONTACTOR AND SEPARATION APPARATUS AND PROCESS OF USING SAME

(71) Applicant: MERICHEM COMPANY, Houston, TX (US)

(72) Inventors: James F. McGehee, Houston, TX (US); Tiejun Zhang, Bellaire, TX (US)

(73) Assignee: MERICHEM COMPANY, Houston, TX (US)

( * ) Notice: Subject to any disclaimer, the term of this patent is extended or adjusted under 35 U.S.C. 154(b) by 198 days.

(21) Appl. No.: 15/485,488

(22) Filed: Apr. 12, 2017

(65) Prior Publication Data
US 2017/0216741 A1    Aug. 3, 2017

Related U.S. Application Data

(62) Division of application No. 13/546,634, filed on Jul. 11, 2012, now Pat. No. 9,656,185.

(51) Int. Cl.
*B01D 11/04* (2006.01)
*B01D 17/02* (2006.01)
*B01D 17/04* (2006.01)
*B01D 11/00* (2006.01)

(52) U.S. Cl.
CPC .......... *B01D 17/045* (2013.01); *B01D 11/043* (2013.01); *B01D 17/0202* (2013.01); *B01D 17/0208* (2013.01); *B01D 17/047* (2013.01); *B01D 2011/005* (2013.01); *Y10T 29/49716* (2015.01)

(58) Field of Classification Search
CPC .............. B01D 11/043; B01D 17/0202; B01D 17/0208; B01D 17/045; B01D 17/047; B01D 2011/005; Y10T 29/49716
See application file for complete search history.

(56) References Cited

U.S. PATENT DOCUMENTS

| | | | |
|---|---|---|---|
| 3,222,413 A | 12/1965 | Woicik et al. |
| 3,830,371 A | 8/1974 | Garcia |
| 4,282,097 A | 8/1981 | Kuepper et al. |
| 4,335,001 A | 6/1982 | Aurelle et al. |

(Continued)

FOREIGN PATENT DOCUMENTS

WO    2004/087286    10/2004

OTHER PUBLICATIONS

International Search Report for Int. App. No. PCT/US2013/049629, completed Jan. 27, 2014.

(Continued)

*Primary Examiner* — Lucas A Stelling
(74) *Attorney, Agent, or Firm* — McDonnell Boehnen Hulbert & Berghoff LLP (57) ABSTRACT

In an improved fiber-film type contactor/separator an enhanced coalescing zone is provided by the presence of a disengagement device connected to a shroud that contains a bundle of high surface area vertical hanging fibers, where the enhanced coalescing zone diverts a portion of an admixture of immiscible liquids to flow radially in a path not parallel to the vertical axis of the hanging fibers whereby the diverted portion of liquids contacts a coalescing surface to cause at least one of the liquids to coalesce into droplets. The immiscible liquids are allowed to settle into separate phase layers and first and second outlets selectively remove the higher density liquid from the lower density liquid.

7 Claims, 3 Drawing Sheets

(56) References Cited

U.S. PATENT DOCUMENTS

| | | | |
|---|---|---|---|
| 4,634,578 | A | 1/1987 | Fiocco |
| 5,705,074 | A | 1/1998 | Brient |
| 2008/0237152 | A1 | 10/2008 | Benachenhou |
| 2010/0320124 | A1 | 12/2010 | Zhang et al. |

OTHER PUBLICATIONS

International Preliminary Report on Patentability and Written Opinion for Int. App. No. PCT/US2013/049629, dated Jan. 13, 2015.
SPI, the plastics industry trade association, "Definitions of Resins—Polyethylene," Jul. 19, 2010, accessed on Nov. 24, 2014.

CONTACTOR AND SEPARATION APPARATUS AND PROCESS OF USING SAME

CROSS REFERENCE TO RELATED APPLICATIONS

The present application is a divisional of U.S. application Ser. No. 13/546,634 filed Jul. 11, 2012 which is hereby incorporated by reference into the present application.

FIELD OF INVENTION

The invention relates to a method and apparatus for contacting and separating a mixture of at least two liquids having different densities in a non-dispersive process utilizing a plurality of vertically hanging fibers contained in a shroud that terminates with a disengagement device that provides an enhanced coalescing zone (ECR). In particular, the invention is useful when the liquids have relatively low interfacial tension (IFT). The ECR eliminates or greatly reduces the accumulation of dispersed liquid mixture that can lead to carry-over and poor separation efficiency. The apparatus can be used for treating liquid hydrocarbons in order to convert acidic impurities, such as mercaptans, to less odorous sulfur compounds.

BACKGROUND

In most hydrocarbon treatment processes it is often necessary at some point in the process to contact and then separate two or more liquids from each other based on density differences. One approach is to use Merichem Company's FIBER FILM® contactor technology in combination with a horizontal settling vessel. These fiber-film type separators/contactors are described in U.S. Pat. Nos. 3,758,404; 3,977,829 and 3,992,156, all of which are incorporated herein by reference. The basic design of a fiber-film type contactor/separator comprises a plurality of vertical hanging fibers contained either totally or partially within a vertical shroud that is configured to maintain the liquids within the inside of the shroud and in contact with the hanging fibers as the liquids flow downward parallel to the axis of the fibers and shroud. Once the liquids exit the shroud they enter a separation section, typically a horizontal settler, where gravity separates the phases, with the lower density liquids forming an upper layer and the higher density liquids forming a lower layer. Each layer can then be selectively removed from the separation section of the apparatus.

Separation efficiency is a function of the interfacial tension of the liquids to be separated; however, residence time and surface area of the separation device are also important variables. Low interfacial tension (IFT) of the liquids in the admixture causes formation of emulsions and high dispersions, which manifest in the absence of a clear well defined phase boundary interface. The term "dispersion" is understood to mean a two-phase liquid mixture that is in the process of separation over the time frame of seconds to minutes in the vessel, as opposed to individual droplets of one phase in another phase. A poor separation could simply be tolerated, however, it would then become necessary to force the effluent through a separate mechanical separation device, such as packed bed, centrifuge, centrifugal liquid separator, hydro cyclone or the like. These solutions have disadvantages of high capital cost and additional energy input. In addition to mechanical attempts to cure the problem, sometimes the addition of chemicals is used in an attempt to encourage the liquid phases to separate (in a similar way as antifoams are used to resolve gas-liquid mixtures). This incurs additional expense and is typically not very effective because with the low interfacial tension of the system the addition of surface-active chemicals may make the problem worse.

This dispersion problem occurs in hydrocarbon treatment processes, for example, the desulfurization of kerosene using an aqueous catalyst solution via an oxidation reaction. In such processes two liquid phases are created that can be very difficult to separate downstream because of the low interfacial tension of the two liquid phases. When using a fiber-film type contactor/separator the two-phase mixture does not travel exclusively down the tail of the fibers, but tends to spread out as a loose dispersed liquid mixture. The mixture stays together and has the visual appearance of foam, forming a so-called "dispersion band". If the flow of either liquid is stopped, the dispersion band may ultimately collapse over time. Even when the liquid flows are not stopped, the dispersion can collapse on its own, at a rate depending on the vessel system and properties of the liquids, especially their interfacial tension. However, if the production rate of this dispersion is higher than the collapse rate, the dispersion band will grow in volume, piling up in the vessel. This will then lead to a high carryover of the heavy liquid into the light overhead product. Although the art has used coalescers for liquid/liquid service, they are usually designed to handle only small amounts of a dispersed liquid. One example is a candle filter made of a suitably hydrophobic or hydrophilic medium, or both, that forces the two phase mixture to adhere to one or the other surface and form larger droplets, which are then easy to separate by gravity. Such devices unfortunately suffer from the disadvantage that it adds extra pressure drop and pumping costs to the overall process. Additionally, larger amounts or slugs of such dispersions can easily overcome these known coalescers.

Another problem of this accumulation of dispersed liquid mixture is the lack of a clear interface between the liquid phases in the lower section of the separation vessel. This may lead to difficulty in detecting the interface by traditional instrumentation such as capacitance probes, guided-wave radar instruments, level floatation switches and the like. Lack of robust level detection makes controlling the liquid interface level very difficult. Moreover, this lack of a defined interface could result in the true pure liquid level dropping to the point at which pumps cavitate, or where the light liquid is drawn into the pump suction, leading to severe operating problems. The problem of forming a two-phase dispersion is particularly severe when the interfacial tension (IFT) is less than 10 dynes/cm as measured by standard methods using an interfacial tensiometer.

Up until the present invention, the solution to resolving such a two-phase dispersion was to use a very large horizontal vessel to disengage or collapse the dispersion over a relatively long residence time. The large horizontal surface area in the vessel allows the dispersion to form a relatively thin dispersion band or "rag layer," which has sufficient residence time to collapse. Such large horizontal vessels, for example as depicted in Frank, T. C. et. al. "Liquid-liquid dispersion fundamentals", Perry's Chemical Engineers' Handbook, 8th ed. 2008 chapt. 15 p. 98, have large capital costs and need a large foot print that occupies valuable real estate. The present invention solves these problems by using an enhanced coalescing zone that contains the hanging fibers and allows a portion of liquids to flow out of a disengagement device where it contacts a coalescing surface in a non-parallel path relative to the vertical axis of the hanging fibers.

SUMMARY

Our invention is directed to an improved apparatus and process for separating at least two immiscible liquids into separate phases. The apparatus comprises a vertical vessel having an interior volume that contains a shroud positioned within the interior volume. By "vertical vessel" we mean a vessel containing the shroud that has generally the same diameter at the top as it does at the bottom where the denser liquid is removed. In other words, there is no abrupt transition from an upper vertically oriented circular section to a lower horizontal section. At the top of the shroud, which may extend above and outside of the vessel, is an inlet in fluid communication with the inside of the shroud, preferably connected to a liquid distributor located within the topmost section of the shroud. Within the shroud hangs one or more bundles of long ribbons or fibers defining a vertical axis that are configured for contacting an admixture of at least two immiscible liquids comprising a higher density liquid and a lower density liquid. At the bottom of the shroud is a disengagement device defining an enhanced coalescing zone (ECZ) configured to allow a portion of the admixture of liquids to flow radially out of the ECZ and to contact a coalescing surface associated with the disengagement device.

The uppermost or top portion of the shroud can extend above the top of the vessel and defines an upper contact zone. The upper contact zone portion of the shroud may be contained within another structure that extends upward on the top of the vessel. The section of the shroud that is within the interior of the vessel and that is positioned above the ECZ defines a lower contact zone. The disengagement device can be an extension of the bottom section of the shroud and defines the ECZ. The hanging fibers are positioned vertically within the shroud and within the disengagement device relative to the ground level defining a vertical axis that is the same as the axis of the vessel. The fibers within the shroud of the lower contact zone can be a separate independent bundle or an extension of the fiber bundle that is contained within the upper contact zone positioned above the lower contact zone on top of the vessel. Likewise, the fibers within the ECZ and contained within the disengagement device can be a separate independent bundle or an extension of the fiber bundle that is contained within the lower contact zone positioned above the ECZ. Preferably, the fibers comprise long thin filaments or ribbons made of materials selected from a group consisting of, but not limited to, metal fibers, glass fibers, polymer fibers, graphite fibers and carbon fibers that meet two criteria: (1) the fiber material must be preferentially wetted by the admixture of at least two immiscible liquids; and (2) the fibers must be of a material that will not contaminate the process or be destroyed by it, such as by corrosion.

Within the upper and lower contact zones of the shroud the admixture of liquids fed to the apparatus is contained within the shroud and contacts the fibers as the liquids flow downward parallel to the vertical axis. The walls of the shroud in the upper and lower contact zones are solid (i.e., contain no openings) and can take the form of a tube-like or conduit like structure that can be round, oval, square, rectangular or any shape that ensures contact of the hanging fibers with the admixture of liquids. The actual cross-sectional shape of the shroud is not important to the invention and the shroud of the lower contact zone may or may not have the same diameters or shapes as the shroud of the upper contact zone. Because the two contact zones of the shroud have no openings in the wall, the admixture of liquids must flow downward, parallel to the vertical axis. Together, the contact zones function to contain the admixture of liquids within the shroud such that the admixture of liquids is forced to continue flowing in a downward direction parallel to the vertical axis while contacting the bundle of hanging fibers, to achieve desired treatment.

The admixture of liquids is allowed to flow downward through the two contact zones to enter the enhanced coalescing zone (ECZ) that includes the disengagement device. In the ECZ, a portion of the admixture of liquids exits the disengagement device following a radial flow path that is not parallel to the vertical axis defined by the hanging fibers. As the portion of the admixture of liquids exits the disengagement device, a portion of one of the immiscible liquids coalesces to form a coalesced liquid. Depending on the properties of the coalesced liquid, droplets, rivulets or small steams are formed that fall downward on the outside of the disengagement device and parallel to the vertical axis. The coalesced liquid, if it was originally a portion of the higher density liquid, will flow downward and will settle into the lower phase layer at the bottom of the vessel interior. This lower phase layer is preferably located below the open end of the disengagement device and below the ECZ. The less dense liquid in the admixture of liquids exiting the disengagement device forms the upper phase layer within the interior of the vessel that defines a gravity settling zone occupying the interior volume between the outside wall of the shroud and the inside wall of the vessel. Within the gravity settling zone the liquids undergo further separation where the higher density liquid is separated from the lower density liquid through the formation of a lower layer comprising the higher density liquid and the formation of an upper layer comprising the lower density liquid, where a liquid interface is defined as a location where the two layers join. Preferably, the liquid interface is located at a point below the ECZ.

The gravity settling zone includes the annular space between the outer wall of the shroud and the inner wall of the vessel. This zone is designed to allow a sufficient residence time to provide additional separation time and efficiency. A first outlet is located at or near the top of the vessel and is configured to withdraw or remove the lower density liquid that has settled in the gravity settling zone. In some process designs it is desirable to include a secondary coalescing device positioned within a top portion of the interior of the vessel just below the first outlet. A second outlet is provided at or near the bottom of the interior of the vessel to allow removal of the heaver more dense liquid in the lower phase layer.

The disengagement device can be a separate structure connected to the shroud or an extension of the shroud provided that it allows the admixture of liquids to exit both radially through one or more openings and through an open end parallel to the vertical axis as opposed to the radial flow path that is not parallel to the vertical axis. The open end of the disengagement device prevents pressure drop problems associated with prior art attempts to eliminate or reduce dispersions caused by low interfacial tension systems. A preferred disengagement device comprises a vertical segment connected to the bottom of the shroud at the end of the lower contact zone and having one or more side openings or holes that allow non-parallel flow of a portion of the admixture of liquids. The disengagement device can be a perforated extension of the shroud at the bottom of the lower contact zone, preferably in the form an annulus or alternatively, it can be a wire screen or other cage-like support structure. Most preferably, the disengagement device has associated therewith a coalescing surface configured to contact the portion of the admixture of liquids that exits radially from the disengagement device following a flow path that is roughly perpendicular or at approximately a right angle relative to the vertical axis.

The coalescing surface is selected from the group consisting of wire grid, porous metal wall, open-celled sponge, woven wire screen, knitted wire mesh, woven or non-woven fibrous material of metal, polymer resins or combinations of metal and polymer resins, multiple co-woven filaments, packing, fiber filters, and combinations of media layer on each other. Materials used to fabricate the coalescing surface include, stainless steels, Duplex steels, alloys, plastics, fluoropolymers, fibrous components (polyolefin, polyesters, glass fibers, and like materials), and mixtures of same. The coalescing surface is most advantageously configured to interact with one of the liquids in the admixture and to form small droplets. These droplets then grow in size to larger droplets of the heavier phase that can then be easily settled out from the lighter liquid by gravity. The volumetric void fraction of the coalescing surface should be less than 98% and most preferably less than or equal to 96%.

Wire mesh coalescing surfaces can comprise a combination of wires and fibers in order to create a maximum surface area for droplets to coalesce. In many cases the wire and fiber are from a different construction material, where one is hydrophilic (e.g. metal) and the other is hydrophobic (for example, polyolefin or fluoropolymer) which enhances the separation. There is an increased coalescence effect at the junction point between both materials. Therefore using both the metal and polymeric materials will increase coalescing efficiency significantly. The coalescence surface of our invention can take the form of a physical wrapping around, or positioned adjacent to, slots, holes, perforations, or other openings in the disengagement device. This wrapped coalescence surface is held in place by bands, ties, clamps or other fasteners attached to the external surface of the disengagement device provided that the exiting admixture of liquids is forced to contact the coalescing surface.

Most preferably the coalescence surface is incorporated in an annulus or ring that forms part of the vertical length of the disengagement device and defines the enhanced coalescing zone (ECZ). On the inner ring or wall of the annulus are a plurality of holes that allow the admixture of liquids to pass into the inside of annulus where the admixture contacts the coalescing surface that is positioned or packed into the annulus. The outer ring or wall of the annulus likewise has a plurality of holes, slots, perforations, screen or grid openings or other such openings to allow the admixture to pass to the outside of the disengagement device. The type of openings used in the outer wall may or may not be the same as that used on the inner wall. Regardless of whether the coalescing surface is located in an annulus or wrapped around a perforated structure in the disengagement device, the volumetric void fraction of the coalescing surface is preferably in the range of from about 90% to about 99%, more preferably from about 95% to 98%. The coalescing surface should preferably occupy a volume that is sufficient to eliminate dispersion and form a coalesced liquid as either droplets or a continuous liquid stream. The amount of coalescing surface can be varied to increase or decrease the holdup or residence time necessary to form the coalesced liquid. A preferred coalescing material is a co-woven type material comprised of 316 stainless steel and polytetrafluoroethylene (Teflon) fiber filaments, with very fine fiber size and having an installed density of around 15 to 30 lb/ft$^3$.

The apparatus of our invention finds utility in the separation of at least two immiscible liquids, such as, but not limited to, an admixture of water, or an aqueous solution, and hydrocarbons. In another aspect, the invention is directed to an improved liquid hydrocarbon treatment process that combines the best of a conventional sweetening process with that of the more complicated extraction processes. The process converts (as opposed to extracts) mercaptans including higher molecular weight mercaptans ($C_4$ and higher) to disulfide oils (DSO) using an aqueous treatment solution and an oxidation reaction. Ultimately, the liquids in the sweetening process are subjected to a separation step. The invention can be used in treating any hydrocarbon, including crude oil, LPG, kerosene, naphtha or other fuels, where the interfacial tension between the hydrocarbon commodity and the treating solution is less than 10 dynes/cm and more particularly less than 5 dynes/cm and where the phases tend to remain as a dispersion which cannot be immediately resolved and accumulates in the vessel. The invention achieves separation residence times many times shorter than in conventional gravity settlers.

As used herein, disulfide oil or DSO is meant to include a mixture of possible disulfides, including dimethyl disulfide, diethyl disulfide, methyl ethyl disulfide and higher disulfides. Likewise, the term mercaptan is meant to include any of a class of organosulfur compounds that are similar to the alcohol and phenol, but containing a sulfur atom in place of the oxygen atom. Compounds containing —SH as the principal group directly attached to carbon are named 'thiols'.

In yet another aspect of our invention the separation process and apparatus described above finds utility in a process comprising a method for treating a hydrocarbon containing mercaptans where the liquid hydrocarbons containing mercaptans are combined with an oxygen containing gas to form a feed stream. That feed is contacted with an aqueous treatment solution comprising water, alkali metal hydroxide, a polyvalent chelated metal catalyst, and at least one alcohol, preferably having atmospheric boiling points of 65° C. to 225° C. Oxidation occurs in a contactor zone comprising vertical hanging fibers contained within a shroud, where the catalyst and oxygen are used to convert the mercaptans via an oxidation reaction to disulfide oils. The contacting step occurs primarily at the uppermost region of the bundle of hanging vertical fibers contained within the shroud and defining the upper contact zone. Additional contacting and the beginning of separation of the liquids occurs within the lower portion of the shroud defining the lower contact zone. The oxidation reaction and intimate contact that occurs in the contact zones forms a product admixture of one or more immiscible liquids that is directed by the shroud to the enhanced coalescing zone (ECZ). Ultimately the admixture travels downward and through the EZC exiting the disengagement device and entering the gravity settling zone. An upgraded hydrocarbon stream containing the disulfide oils is separated from the admixture forming an upper layer that can be removed from the process through a first outlet. The aqueous treatment solution forms a lower layer and is also removed from the secondary separation zone through a second outlet. This solution can be recirculated to treat additional sour hydrocarbon, when necessary, after being replenished with make-up catalyst and/or other ingredients of the treatment solution.

In another embodiment, our invention involves a two-stage method for treating a hydrocarbon containing mercaptans where at least one of stages, which are positioned in series, uses the contactor/separator apparatus of the invention as described above. In this two stage process a liquid hydrocarbon is mixed with air to form a first feed, then contacting the first feed in a first stage contactor/separator with an aqueous treatment solution comprising water, alkali metal hydroxide, a chelated polyvalent metal catalyst, and at least one alcohol, preferably having atmospheric boiling points of 65° C. to 225° C. The presence of the oxygen from the air and the catalyst oxidize most of the mercaptans in the first feed to disulfide oils to form a first admixture. This admixture formed in the contact zone is then allowed to flow downward in the shroud into the enhanced coalescing zone. After exiting the side openings and the open end of the disengagement device in the ECZ, an upper layer of an upgraded hydrocarbon stream containing the disulfide oils is separated from the aqueous lower layer and exits the vessel through the annular space between the outer wall of the shroud and the inner wall of the vessel, i.e., the gravity settling zone. The separated upgraded hydrocarbon stream is then mixed with additional air to form a second feed. This second feed is further contacted in a second fiber-film type contactor/separator with a second stream of the aqueous treatment solution to oxidize any remaining mercaptans to disulfide oils to form a second admixture. This second stage fiber-film type contactor/separator can have the same contacting zone, enhanced coalescing zone, and gravity settling zone as the first stage contactor/separator. The second admixture of liquids is ultimately separated into a low density liquid phase in an upper layer and a high density liquid phase in a lower layer. A second upgraded hydrocarbon stream containing the disulfide oils is removed from the process as an overhead product stream. Similar steps may be repeated for the third and fourth stages, if needed.

Contacting of the admixture of immiscible liquids within the contact zones and the enhanced coalescing zone with the bundle(s) of hanging fibers causes the fibers to be preferentially wetted by the aqueous liquid to form a thin film on the surface of fibers, and consequently presents a large surface area for contact with the hydrocarbon without substantial dispersion of the aqueous phase in the hydrocarbon. The rapid liquid-liquid mass transfer is enabled by both the large surface area and the functionality of the aqueous solution, which in turn enables the mercaptans to be transferred from the hydrocarbon to contacting with the thin film of the aqueous treatment solution. As mentioned earlier, two or more stages of contacting with an aqueous treatment solution may be adopted to achieve a greater extent of treating efficiency.

The catalyst composition used in the oxidation process is preferably a liquid chelated polyvalent metal catalyst solution. Polyvalent catalysts include, but are not limited to, metal phthalocyanines, wherein the metal cation is selected from the group consisting of manganese (Mn), iron (Fe), cobalt (Co), nickel (Ni), copper (Cu), zinc (Zn), ruthenium (Ru), rodium (Rh), palladium (Pd), silver (Ag) etc. Catalyst concentration is from about 10 to about 10,000 ppm, preferably from about 20 to about 4000 ppm. The particular catalyst selected may be included during preparation of the treatment solution and/or later added to the solution at the place of its use.

The aqueous treatment solution of the oxidation process also includes one or more alcohols that have atmospheric boiling points of from 65° C. to 225° C. These alcohols include, but are not limited to, methanol, ethanol, 1-propanol, 2-propanol, 2-methyl-1 propanol, 2-methyl-2-butanol, cyclohexanol, phenol, cresols, xylenols, hydroquinone, resorcinol, catechol, benzyl alcohol, ethylene glycol, propylene glycol, and other alkyl phenols. When mixed with one or more alkali metal hydroxides, alkali metal salts of the alcohol are formed, preferably in a concentration of from about 5 to about 40 wt %, most preferably from about 10 to about 35 wt %. One type of preferred alcohol is an aromatic alcohol, which are compounds represented by a general formula of aryl-OH. The aryl can be phenyl, thiophenyl, indolyl, tolyl, xylyl, and alike. Preferred aromatic alcohols include phenol, cresols, xylenols, methyl ethyl phenols, ethyl phenols, trimethyl phenols, naphthols, alkylnaphthols, thiophenols, alkylthiophenols, and similar phenolics. Non-aromatic alcohols can be primary, secondary or tertiary alcohols, including methanol, ethanol, n-propanol, iso-propanol, cyclohexanol, 2-methyl-1-propanol, and 2-methyl-2-butanol. A mixture of different alcohols can also be used. The preferred alcohols have an atmospheric boiling point of from about 80° C. to about 215° C. The preferred alkali metal salts of alcohol include, but are not limited to, potassium cyclohexoxide, potassium iso-propoxide, dipotassium propylene glycoxide, potassium cresylates as well as their sodium counterparts, and mixtures thereof.

In a most preferred treatment solution formulation, one or more carboxylic acids are included. Such acids include, but are not limited to, fatty acids, naphthenic acids, amino acids, keto acids, alpha hydroxy acids, dicarboxylic acids, and tricarboxylic acids. These acids also react with the alkali metal hydroxides to produce their alkali metal salts in concentrations from about 0 to about 40 wt %, preferably from about 5 to about 25 wt %. In general, the carboxylic acids can include alkanoic acids and naphthenic acids, where the alkanoic acids are represented by R—COOH, where R is a hydrogen or an alkyl group ranging from CH3- (i.e. acetic acid) to CH3(CH2)18- (i.e. arachidic acid). Naphthenic acids are a mixture of multiple cyclopentyl and cyclohexyl carboxylic acids with their main fractions preferably having a carbon backbone of 9 to 20 carbons. A mixture of multiple carboxylic acid compounds can also be used as part of the treatment solution.

The aqueous treatment solution can contain an alkali metal hydroxide selected from lithium hydroxide (LiOH), sodium hydroxide (NaOH), potassium hydroxide (KOH), rubidium hydroxide (RbOH), and cesium hydroxide (CsOH). More than one alkali metal hydroxides can be used. The alkali metal hydroxide is present at a concentration that is more than sufficient to ensure all alcohols and carboxylic acids to form their corresponding alkali metal salts. Sodium hydroxide and especially potassium hydroxide are preferred.

Any number of hydrocarbon feeds with boiling point up to about 350° C. can be treated in our process using our aqueous treatment solution, including, but not limited to, crude oil, kerosene, jet fuel, diesel, light and heavy naphtha. Other feedstocks may include straight run hydrocarbons or cracked or selectively hydrotreated hydrocarbons, LPG, naphtha, crude, crude condensates, and similar materials. Still another possible feedstock that can be used in the process of our invention would include crude oil, ranging from raw crude oil (i.e., untreated and straight out of ground, wellhead oil) to partially or fully treated crudes that have been desalted, dewatered, stripped, or de-odorized and mixtures of these. These so-called "pipeline-ready" crudes or "refinery ready" crude oils at the end of pipeline transportation can be used in our process as the liquid hydrocarbon feed. By the method of our invention, mercaptans in crude oils which have 95 wt % atmospheric equivalent boiling points of up to 600° C. are converted into disulfide oils, prior to fractionation.

Yet another aspect of our invention involves retrofitting existing fiber-film type contactor/separators to add a coalescing zone. In particular, our invention includes a method of retrofitting an existing separation apparatus designed for separating an admixture of at least two immiscible liquids into separate phases, where the separation apparatus before retrofitting comprises a plurality of hanging fibers defining a vertical axis that are contained in a shroud that only allows the admixture of liquids to flow downward along the hanging fibers parallel to the vertical axis. The retrofitting method of our invention comprises adding an enhanced coalescing zone (ECZ) with a disengagement device to the existing shroud where ECZ allows a portion of the admixture of liquids to exit the disengagement device in a flow path that is not parallel to the vertical axis. In other words the admixture flows radially outward relative to the vertical axis and exits the disengagement device. Preferably, in addition to installing the disengagement device, the existing shroud is extended to establish a lower contact zone with a sufficient volume of settling zone between the shroud and the vessel.

A typical retrofitting procedure would involve extending the shroud to surround the free hanging vertical hanging fibers to increase the volume of the lower contact zone. A disengagement device would then be added to the bottom of the lower contact zone, preferably as an annulus extension. The annulus comprises inner and walls each having one or more openings to allow the radial flow of a portion of the admixture of liquids to contact a coalescing surface positioned with the walls. The radial flow of the admixture exits the disengagement device in a non-parallel flow path relative to the vertical axis.

A preferred method to manufacture the disengagement device that contains the coalescing surface, such as, the annulus described above, is to start with rolled steel sheet and to fabricate an upper portion that is not perforated or surrounded by coalescing media. This is essentially a straight section that is configured to contain the bundle of fibers extending through the open end of the upper contact zone and defines the lower contact zone, if the process so requires. The length of this lower contact zone is made so that at the normal operating conditions in the gravity settling zone (i.e., the space between the outside wall of the shroud and the inner wall of the vessel), there is an up-flowing liquid residence time at least as great as the static collapse time of the dispersion, preferably greater than about 4 minutes. The static collapse time is defined as the time needed for the dispersion band to shrink to zero upon ceasing the flow of light and heavy liquids through the fiber bundle. In this way, if there is any re-entrainment of heavy liquid exiting the outside of the enhanced coalescing zone into the gravity settling zone, it will have sufficient time to drop into the bottom of the vessel. The disengagement device comprising one or more openings can be drilled, punched, slotted or in some other way vented to at least 50% open area and preferably as open as possible to still have mechanical integrity. Any wire or rod frame will also work and will avoid the need to drill, cut or punch the openings. The coalescing surface can be installed in any suitable way by wrapping in layers, pleating, blocking or other means so as to have uniform density and leave no holes or gaps. The coalescing layer can be installed either on the inside or the outside of the support structure.

These and other embodiments of our invention will become more apparent from the detailed description of the preferred embodiment contained below.

DETAILED DESCRIPTION

Figure 1:
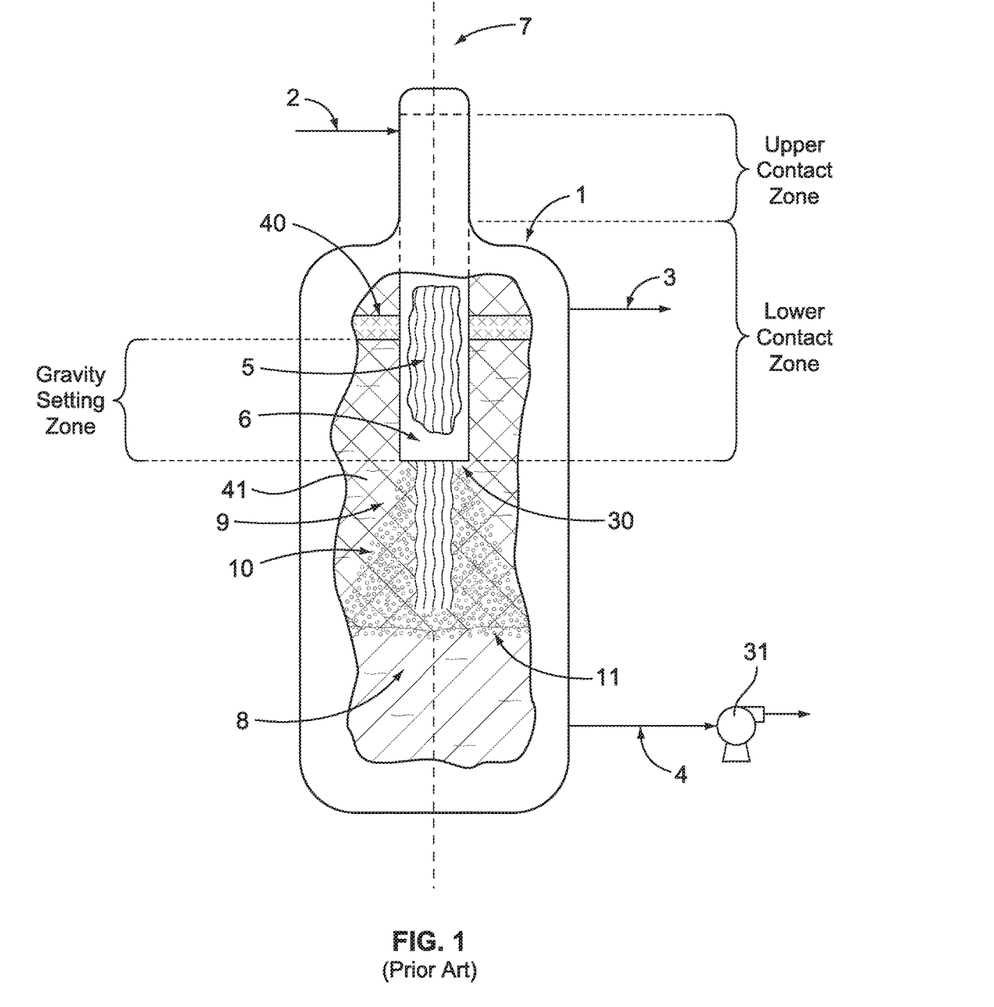
FIG. 1 schematically illustrates a process flow diagram for one prior art process and apparatus for performing an oxidation process followed by the separation of two immiscible liquids.

A comparison of the instant invention with an apparatus and process known in the art is helpful in understanding the improvements in our invention. To that end, FIG. 1 illustrates a prior art process and apparatus for use in a process that uses catalytic oxidation of reactants that results in the formation of an admixture comprising at least two immiscible liquids. The reactants are fed to the process and introduced to vertical vessel 1 through inlet process line 2 where the reactants contact the uppermost portion of a plurality or bundle of hanging fibers 5 that define a vertical axis 7. Notably, vertical vessel 1 does not have a large horizontal section located below the hanging fibers. Preferably the reactants pass through a liquid distributor (not shown) that is positioned at the top of the bundle of fibers. The hanging fibers 5 are contained within a shroud 6 that forces the admixture of liquids to flow parallel to the vertical axis and to contact the hanging fibers. The oxidation reaction primarily takes place within the upper most portion of the shroud 6 defined as the upper contact zone. Further reaction and contact continues in the lower contact zone as the admixture of immiscible liquids continue to flow down the shroud in contact with the vertical hanging fibers.

As the admixture of liquids moves downward inside the shroud the oxidation reaction completes and the fibers begin to facilitate the separation of the liquids into distinct phases. This occurs primarily in the lower contact zone. However, as mentioned, in those processes where the interfacial tension of the liquids is low (i.e., below about 10 dynes/cm), there is a tendency for dispersion to occur that leads to a poorly defined phase interface between the liquids. This is illustrated in FIG. 1 as the piling of the dispersion 10. As the dispersion exits the open end 30 of shroud 6, it begins to accumulate in the interior space/volume 41 of vessel 1 and in particular can grow or enlarge to occupy the annular space between the outside wall of the shroud 6 and the inside wall of the vertical vessel 1. This interior space of the vessel is known as the gravity settling zone. The denser liquid attempts to settle into layer 8 and the less dense liquid flows upward into layer 9. The interface 11 between the two layers is not well defined and typically leads to poor level control. The liquid in layer 9 flows upwards and is removed via a first outlet or process line 3 and the denser liquid in layer 8 flows downwards and is removed via a second outlet or process line 4. If the dispersion is allowed to continue piling it will eventually be carried over into line 3 and will contaminate the less dense liquid. Alternately, if the interface level is controlled too low there is a high probability that there will not be enough dense liquid in the lower layer 8 and this will cause cavitation of pump 31. Additionally, as the interface level drops, the chance of the lighter liquid contaminating the heavy liquid removed via process line 4 is greatly increased. In some instances, an optional coalescing device 40 can be added to the interior of the vessel below the first outlet 3 in an attempt to prevent carryover of the more dense liquid.

Figure 2:
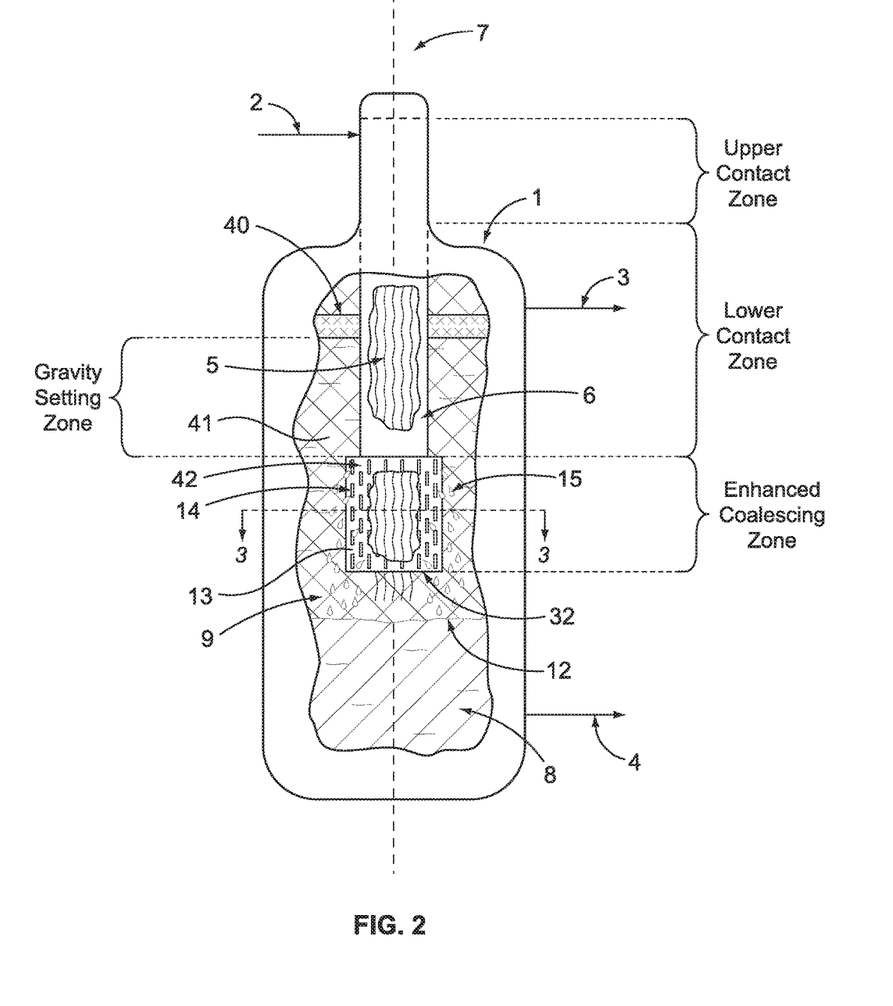
FIG. 2 schematically illustrates a process flow diagram for one possible embodiment of the invention that includes an oxidation process followed by the separation of two immiscible liquids.
Figure 3:
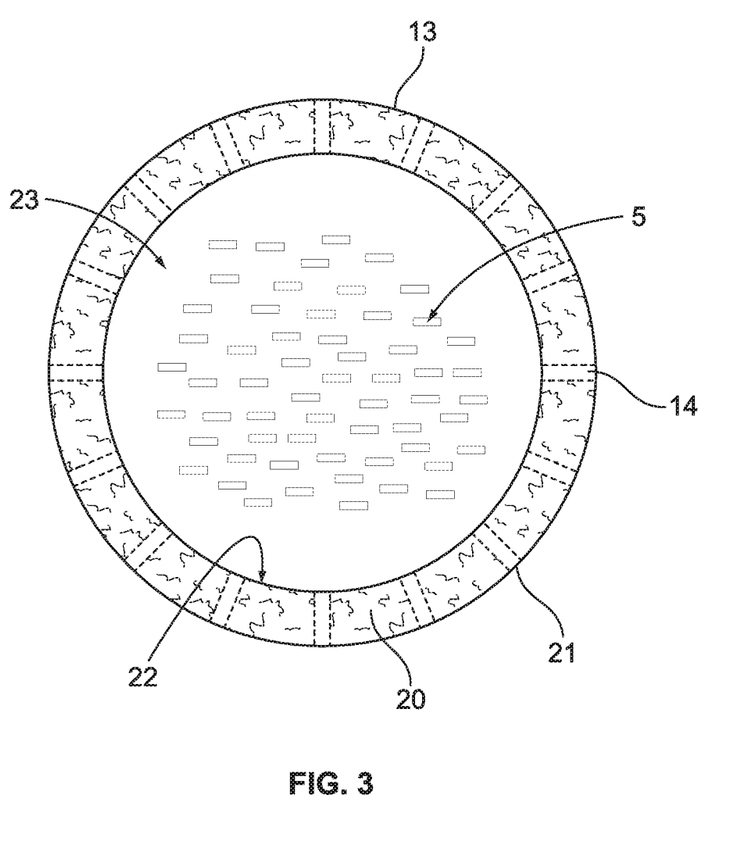
FIG. 3 schematically illustrates a cross-section of a portion of the coalescing zone that uses an annulus containing a coalescing surface.

Our invention directly addresses the situation where the admixture of liquids in the process is characterized as having low interfacial tension (IFT). Specifically, the invention eliminates the piling up or excessive accumulation of the dispersion that results in an ever-enlarging dispersion band and ultimately, carryover of the heavier liquid. FIG. 2 illustrates one possible embodiment of our invention where a disengagement device 13 is added to the bottom of the lower contact zone of shroud 6. Like reference numbers have the same meaning as previously described. The disengagement device 13 defines an enhanced coalescing zone (ECZ) and has an open end 32. In the particular embodiment shown in FIG. 2, the disengagement device 13 comprises an annulus 42, which becomes an extension of shroud 6 and provides side openings to allow radial flow of the admixture of liquids to exit the disengagement device in flow path that is not parallel to axis 7. A cross-section of this annulus 42 is illustrated in FIG. 3 showing the bundle of hanging fibers 5 being contained within the inner wall 22 that forms an interior volume 23.

Both the inner wall 22 and outer wall 21 of the annulus 42 contain one or more openings 14. Inside the annulus is located the coalescing surface 20. The preferred coalescing surface has a volumetric void fraction in the range of from about 90% to about 99%, more preferably from about 95% to about 98%. A preferred coalescing material is a co-woven type material comprised of 316 stainless steel and polytetrafluoroethylene (Teflon) fiber filaments, with very fine fiber size and having an installed density of about 15 to about 30 lb/ft$^3$. The amount of coalescing material added to annulus, or in the cases of a wrapped configuration, is sufficient such that there is enough residence or hold up time of the liquids in the material to cause the liquid to coalesce. The plurality of openings 14 allow a portion of the admixture of liquids to flow through the annulus in a radial flow path that is non-parallel to the vertical axis 7. Preferably, the one or more openings 14 represent at least a 50% open area in the walls of the annulus. These openings can be slots, holes, punctures, or perforations of any shape or dimension.

As the admixture passes through the annulus 13 it contacts the coalescing surface 20 whereby any dispersion in the admixture is collapsed to form droplets 15 (see FIG. 2). These droplets 15 continue to grow until they either fall through the coalescing material or re-enter the fiber bundle or exit through the openings 14 in the outer wall 21. In other words, the formation and growing of the droplets 15 is the coalescing of one of the liquids in the admixture, typically the more dense liquid. When the droplets are of the more dense liquid, they grow and fall, dropping downward to become part of the liquid in layer 8. Because little or none of the dispersion survives the coalescing surface 20, a distinct phase interface 12 is formed between the higher density liquid in layer 8 and the lower density layer 9. This eliminates carry over of the higher density liquid in overhead line 3 and allows for precise control of interface level 12, which avoids pump cavitation and the contamination of the lighter liquid in process line 4. An optional secondary coalescing device 40 can be added to the interior of the vessel below the first outlet 3 to provide an additional safeguard against carryover of the more dense liquid.

As mentioned, the improved contactor/separator of our invention can be used in treating a liquid hydrocarbon stream containing mercaptans by an oxidation process where the hydrocarbons are contacted with an oxygen containing gas and mixed with an aqueous treatment solution in a contactor to convert the mercaptans to disulfide oils, which remain in the hydrocarbon. An upgraded hydrocarbon stream (containing the disulfide oils) is separated from the aqueous treatment solution and removed from the process. In another embodiment, as disclosed more fully below, the process includes at least two stages of contacting, oxidation and separation.

Any hydrocarbon can be treated which contains acidic species such as mercaptans. Representative hydrocarbons include straight run or cracked or selectively hydrotreated, one or more of natural gas condensates, liquid petroleum gas (LPG), butanes, butenes, gasoline streams, jet fuels, kerosenes, diesels, naphthas, crude oil and the like. An example hydrocarbon is a cracked naphtha, such as FCC naphtha or coker naphtha, boiling in the range of about 35° C. to about 230° C. Another hydrocarbon is kerosene/jet fuel, which has a typical boiling range of about 300 to about 550° F. Such hydrocarbon streams can typically contain one or more mercaptan compounds, such as methyl mercaptan, ethyl mercaptan, n-propyl mercaptan, isopropyl mercaptan, n-butyl mercaptan, thiophenol and higher molecular weight mercaptans. The mercaptan compound is frequently represented by the symbol RSH, where R is normal or branched alkyl, or aryl. The mercaptan sulfur is present in the hydrocarbons in an amount ranging from about 20 ppm to about 4000 ppm by weight, depending on the liquid hydrocarbon stream to be treated. The mercaptans range in molecular weight upwards from about $C_4$ or $C_5$, and may be present as straight chain, branched, or both. Specific types of mercaptans which may be converted to disulfide material by the oxidation process of this invention will include methyl mercaptan, ethyl mercaptan, propyl mercaptan, butyl mercaptan, pentyl mercaptan, hexyl mercaptan, heptyl mercaptan, octyl mercaptan, nonyl mercaptan, decyl mercaptan, undecyl mercaptan, dodecyl mercaptan, tridecyl mercaptan, tetradecyl mercaptan, pentadecyl mercaptan, hexadecyl mercaptan, heptadecyl mercaptan, octadecyl mercaptan, nonadecyl mercaptan, various mercaptobenzothiazoles, hydroxy mercaptans such as mercaptoethanol, cysteine, aromatic mercaptans such as thiophenol, methyl-substituted thiophenol isomers, ethyl-substituted thiophenol isomers, propyl-substituted thiophenol isomers, etc.

A hydrocarbon to be treated by the process of the instant invention may be a cracked naphtha or distillate which is hydrotreated to remove undesirable sulfur species and other heteroatoms. An undesirable side effect of hydroprocessing id that hydrogen sulfide formed during hydrotreating reacts with thermally-formed olefins to form mercaptans, which are referred to as reversion or recombinant mercaptans to distinguish them from the mercaptans present in the cracked naphtha or distillate conducted to the hydrotreater. Such reversion mercaptans generally have a molecular weight ranging from about 90 to about 160 g/mole, and generally exceed the molecular weight of the mercaptans formed during heavy oil, gas oil, and residue cracking or coking, as these typically range in molecular weight from 48 to about 76 g/mole. The higher molecular weight of the reversion mercaptans and the branched nature of their hydrocarbon component make them more difficult to remove from the naphtha using conventional caustic extraction.

The oxidation process preferably uses an aqueous treatment solution containing at least one alcohol and an alkali metal hydroxide can treat a hydrotreated naphtha boiling in the range of about 55° C. to about 180° C. and containing reversion mercaptan sulfur in an amount ranging from about 10 to about 100 wppm, based on the weight of the hydrotreated naphtha. Likewise, our process can treat a selectively hydrotreated hydrocarbon, i.e., one that is more than 80 wt. % (more preferably 90 wt. % and still more preferably 95 wt. %) desulfurized compared to the hydrotreater feed but with more than 30% (more preferably 50% and still more preferably 60%) of the olefins retained based on the amount of olefin in the hydrotreater feed.

Although some variations of the process can use a two-phase treatment solution in the absence of oxygen, we prefer a process that uses an aqueous treatment solution in conjunction with an added oxygen-containing gas that causes the mercaptans in the hydrocarbon feed to oxidize to disulfide oils, which remain in the hydrocarbon phase. The treatment solution can be prepared by adding metal phthalocyanine catalyst to an aqueous solution of alkali metal hydroxide and at least one alcohol. Another preferred treatment solution further contains at least one carboxylic acid, such as naphthenic or ethylhexanoic acid.

The apparatus of our invention as shown in FIG. 2 can be used for performing the process of converting sulfur compounds found in a hydrocarbon stream. Preferably, a two-stage process is used where two of the vessels illustrated in FIG. 2 are connected in series. The bundle of vertical hanging fibers in vessel 1 provide a large surface area to allow the reactants to contact and to eventually separate the resultant immiscible liquids formed. The fibers typically comprise a mass of hanging thin filaments or ribbons of metal or other materials of construction allows mass transfer and separation in a non-dispersive manner. While contacting/separation temperature and pressure may range from about 0° C. to about 150° C. and from 0 psig to about 500 psig, preferably the contacting occurs at a temperature in the range of about 25° C. to about 100° C. and a pressure in the range of about 0 psig to about 300 psig. When the hydrocarbon feed has a low atmospheric boiling point, higher pressures during contacting may be desirable to ensure that the contacting with the hydrocarbon occurs in the liquid phase.

During the contacting step the mercaptans are oxidized by the treatment solution, catalyst and oxygen to disulfide oils that ultimately remain in the hydrocarbon phase. Once the admixture of liquids is separated the lighter phase is again contacted with oxygen and treatment solution in a second vessel of basically the same design as the first. Make-up fresh treatment solution and/or catalyst can be added to the process as need to achieve the desired level of oxidation.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A process for separating at least two immiscible liquids into separate phases, comprising, in combination:
    a) feeding an admixture of at least two immiscible liquids comprising a higher density liquid and a lower density liquid to a bundle of hanging fibers contained within a shroud, the shroud having an open bottom and an outer solid wall containing no openings, where the hanging fibers hang out below the open bottom and define a vertical axis and where the admixture of liquids contacts the fibers and flows downward parallel to the vertical axis;
    b) containing the admixture of liquids within the outer solid wall of the shroud such that the admixture of liquids continues flowing downward parallel to the vertical axis of the hanging fibers;
    c) allowing the admixture of liquids to enter a perforated extension positioned at the bottom of the shroud that defines an enhanced coalescing zone, the perforated extension extending downward from the bottom of the shroud to enclose the vertical hanging fibers that extend out beyond the bottom of the shroud such that the vertical hanging fibers extend out beyond an open end of the perforated extension, where the perforated extension comprises an annulus having a coalescing surface and an open center configured to allow the vertical hanging fibers to extend through the open center, where the annulus has inner and outer walls each having one or more openings and the coalescing surface is positioned between the inner and outer walls adjacent to the one or more openings of the inner and outer walls, where a portion of the admixture of liquids exit the enhanced coalescing zone through one or more openings in the inner wall following a flow path that is not parallel to the vertical axis;
    d) coalescing a portion of one of the immiscible liquids as it passes through the coalescing surface to form a coalesced liquid; and
    e) separating the higher density liquid from the lower density liquid within a gravity settling zone by allowing the formation of a lower layer comprising the higher density liquid and the formation of an upper layer comprising the lower density liquid, where a liquid interface is defined as a location where the two layers join and is located at a point below the enhanced coalescing zone, wherein the coalesced liquid flows downward to become part of the lower layer.

2. The process of claim 1 where the higher density liquid comprises an aqueous solution.

3. The process of claim 1 where the lower density liquid comprises a hydrocarbon or mixture of hydrocarbons.

4. The process of claim 1 where the higher density liquid comprises an aqueous solution and the lower density liquid comprises a hydrocarbon or mixture of hydrocarbons.

5. The process of claim 1 further comprising continuously removing a portion of the lower density liquid from the upper layer and continuously removing a portion of the higher density liquid from the lower layer.

6. The process of claim 5 where at least a portion of the higher density liquid withdrawn from the lower layer is recirculated to a top portion of the bundle of fibers.

7. The process of claim 6 where the lower density liquid withdrawn from the upper layer is mixed with a treatment solution to form an immiscible mix of liquids and is processed in a second stage treatment process comprising:

f) feeding the mix of liquids to a second bundle of hanging fibers contained within a second shroud, the second shroud having an open bottom and an outer solid wall containing no openings, where the second bundle of hanging fibers hang out below the open bottom of the second shroud and define a vertical axis and where the mix of liquids contacts the fibers and flows downward parallel to the vertical axis;

g) containing the mix of liquids within the outer solid wall of the second shroud such that the mix of liquids continues flowing downward parallel to the vertical axis of the second bundle of hanging fibers;

h) allowing the mix of liquids to enter a perforated extension positioned at the bottom of the second shroud that defines a second enhanced coalescing zone, the perforated extension of the second shroud extending downward from the bottom of the second shroud to enclose the second bundle of vertical hanging fibers that extend out beyond the bottom of the second shroud such that the second bundle of vertical hanging fibers extend out beyond an open end of the perforated extension of the second shroud, where the perforated extension of the second shroud comprises an annulus having a second coalescing surface and a second open center configured to allow the second bundle of vertical hanging fibers to extend through the second open center, where the annulus of the second shroud has inner and outer walls each having one or more openings and the second coalescing surface is positioned between the inner and outer walls of the annulus of the second shroud adjacent to the one or more openings of the inner and outer walls, where a portion of the mix of liquids exit the second enhanced coalescing zone through one or more openings in the inner wall of the annulus of the second shroud following a flow path that is not parallel to the vertical axis;

i) coalescing a portion of one of the mix of liquids as it passes through the second coalescing surface to form a second coalesced liquid; and j) separating a second higher density liquid from a second lower density liquid within a second gravity settling zone.

* * * * *